United States Patent

[11] 3,600,503

| [72] | Inventor | Moses W. Gaylord<br>Pittsburgh, Pa. |
|---|---|---|
| [21] | Appl. No. | 22,757 |
| [22] | Filed | Mar. 26, 1970 |
| [45] | Patented | Aug. 17, 1971 |
| [73] | Assignee | Koppers Company, Inc. |

[54] DOWNLEAD INSULATOR
3 Claims, 4 Drawing Figs.

[52] U.S. Cl. .................................................. 174/164,
52/148, 174/168, 248/71
[51] Int. Cl. ..................................................... H01b 17/16
[50] Field of Search .......................................... 174/DIG. 4,
2, 6, 40 R, 45 R, 158 R, 158 F, 164, 165, 168, 174,
194, 200, 205; 248/65, 71, 220.5, 221; 52/148

[56] References Cited
UNITED STATES PATENTS

| 346,972 | 8/1886 | Wilson | 174/168 |
| 846,001 | 3/1907 | Blessing | 52/148 |
| 894,616 | 7/1908 | Fay | 174/194 X |
| 1,342,111 | 6/1920 | Howe | 174/174 X |

FOREIGN PATENTS

| 188,769 | 2/1957 | Austria | 174/194 |
| 106,339 | 4/1967 | Denmark | 174/158 F |
| 658,667 | 10/1951 | Great Britain | 174/168 |

*Primary Examiner*—Laramie E. Askin
*Attorneys*—Sherman H. Barber, Oscar B. Brumback and Olin E. Williams

ABSTRACT: A downlead insulator for supporting pole line hardware has a hollow tubular cross section and is made of fiberglass reinforced resin. A plastic sleeve on one end fits into a hole in the pole and the downlead or grounding wire coacts with and is secured to the other end of the downlead insulator.

PATENTED AUG 17 1971 3,600,503

INVENTOR.
MOSES W. GAYLORD
BY Sherman H Barber
Attorney

DOWNLEAD INSULATOR

BACKGROUND OF THE INVENTION

Utility poles are used to support electrical conductors, whether they be single wires, groups of wires, or cable conductors, and it is customary practice to provide a static or grounding wire or conductor at the uppermost part of the structure to provide lightning protection. At selected poles or structures, a downlead wire is attached to the static wire and is routed to the bottom of the pole for electrically grounding. In traversing this distance, the downlead wire passes through the phases or conductors that carry the distribution or transmission voltages. The purpose of the downlead insulator is to locate and maintain the grounding wire in a definite position and spacing with respect to the conductors. One or more downlead insulators may be used per structure.

One form of downlead insulator is a solid fiber glass reinforced resin rod that is equipped with a fitting at one end to engage and clamp to the downlead wire, and with or without a fitting at the other end to provide a connection to the utility pole. The conventional downlead wire is bare copper or aluminum ranging in diameter from 0.125 inch to 0.500 inch.

Presently available downlead insulators have not proved to be entirely satisfactory for several reasons, one or which is economical; wherefore, the downlead insulator of the present invention is both less costly and simpler to make and easier to install and to maintain. One of the problems with present drive-in type downlead insulators is that during climatic changes, it has a tendency to shift the location of the grounding wire (horizontal arc) and thus change the originally designed spacing of the ground wire with respect to the conductors.

SUMMARY OF THE INVENTION

A downlead insulator according to the invention is a hollow fiber glass reinforced resin tube having a sleeve on one end of the tube that cooperates with a hole in a utility pole and an opening in the other end. A nonmetallic fastening device coacts with the downlead grounding wire to hold it in place in the opening.

For a further understanding of the invention and for advantages and features thereof, reference may be made to the accompanying drawing which shows, for the purpose of exemplification, an embodiment of the invention.

DETAILED DESCRIPTION

Figure 1:
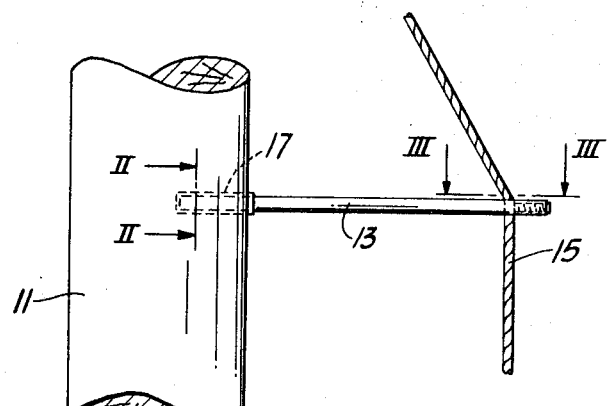
FIG. 1 is a schematic elevational view of a downlead insulator in accordance with the invention.

Referring to FIG. 1, a conventional wooden utility pole 11 is provided with a downlead insulator 13 that is connected at one end, the left-hand end as viewed in FIG. 1, to the utility pole 11, and that is connected to a conventional stranded steel guy wire 15.

Figure 3:
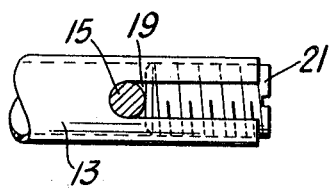
FIG. 3 is a view along line III-III of FIG. 1.

The downlead insulator 13 is a hollow tube of fiber glass reinforced resin, preferably, that is provided with a plastic sleeve 17 at one end. In a preferred embodiment of the invention, the plastic sleeve 17 is a flexible plastic material, such as plastisol or the product sold and marketed by Dow-corning and known in the trade as Dow-Corning 1890 protective sealer, which may be applied to the end of the insulator rod by spraying or dipping or in any other suitable manner. The other end of the downlead insulator is provided with a slot 19, as shown in FIG. 3 and a threaded nonmetallic screw 21; the interior of the outer end of the downlead insulator 13 is threaded, of course, to receive the nonmetallic screw 21.

Figure 4:
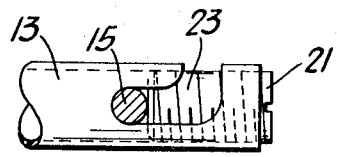
FIG. 4 is a view similar to that of FIG. 3, but showing a modification in one end of the insulator.
Figure 2:
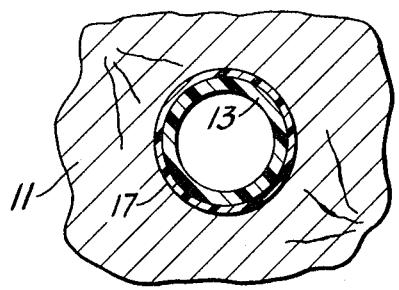
FIG. 2 is a sectional view along line II-II of FIG. 1.

A modification of the outer end of the downlead insulator 13 is shown in FIG. 4, and consists in a J-shaped slot 23 instead of the elongate straight slot 19.

In use, the utility pole 11 is already drilled to receive a downlead insulator and such insulator is prepared with the plastisol sleeve and screw end slot. The plastisol end of the downlead insulator is inserted into the hole, forcibly if necessary, and the guy wire is inserted into the slotted end. Then the screw is threaded into the end of the downlead insulator to secure the guy in place.

Those skilled in the art will recognize from the foregoing description several significant features and advantages among which are:

that the plastisol sleeve, being resilient, readily adapts to the hole in the wooden utility pole when it swells and shrinks due to climatic changes;

that the nonmetallic fastening device eliminates galvanic corrosion at the downlead end. Present systems using a copper wire in contact with a ferrous metal clamping device result in a galvanic cell;

that the entire system, having no metallic parts is not subject to corrosion;

that the plastisol sleeve is weather resistant as is the insulator, wherefore the combination is practically indestructible; and that the entire nonmetallic downlead insulator reduces electronic emissions that interfere with radio reception.

What I claim is:

1. A downlead insulator for use with a wooden utility pole and the like wherein there is a hole having a size slightly larger than the nominal size of the downlead insulator comprising:
   a. a hollow elongate rod of fiber glass reinforced resin;
   b. a flexible plastic coating on an end portion of said rod that is to be inserted into said hole whereby said rod can be secured in position relative to said utility pole;
   c. a slot in the other end of said rod; and
   d. means cooperating with said slotted end for holding said downlead relative to said rod.

2. The invention of claim 1 wherein:
   a. said means is a nonmetallic plug in the hollow rod.

3. The invention of claim 1 wherein:
   a. said slotted end of said rod is internally threaded; and
   b. said means is a threaded nonmetallic screw that cooperates with said internal threads.